US009825291B2

United States Patent
Song et al.

(10) Patent No.: US 9,825,291 B2
(45) Date of Patent: Nov. 21, 2017

(54) POSITIVE ACTIVE MATERIAL FOR LITHIUM SECONDARY BATTERY AND METHOD OF PREPARING SAME

(71) Applicant: KOREA ELECTRONICS TECHNOLOGY INSTITUTE, Seongnam-si, Gyeonggi-do (KR)

(72) Inventors: Jun Ho Song, Seongnam-si (KR); Young Jun Kim, Yongin-si (KR); Jae-Hun Kim, Yongin-si (KR); Kyoung Joon Lee, Seoul (KR); Min-Woo Lee, Ansan-si (KR)

(73) Assignee: KOREA ELECTRONICS TECHNOLOGY INSTITUTE, Seongnam-si, Gyeonggi-Do (KR)

( * ) Notice: Subject to any disclaimer, the term of this patent is extended or adjusted under 35 U.S.C. 154(b) by 531 days.

(21) Appl. No.: 14/375,140

(22) PCT Filed: Sep. 21, 2012

(86) PCT No.: PCT/KR2012/007598
§ 371 (c)(1),
(2) Date: Jul. 29, 2014

(87) PCT Pub. No.: WO2013/115451
PCT Pub. Date: Aug. 8, 2013

(65) Prior Publication Data
US 2015/0004489 A1    Jan. 1, 2015

(30) Foreign Application Priority Data
Jan. 31, 2012   (KR) .................. 10-2012-0010054

(51) Int. Cl.
*H01M 4/505* (2010.01)
*H01M 4/525* (2010.01)
(Continued)

(52) U.S. Cl.
CPC ........ *H01M 4/485* (2013.01); *C01G 45/1228* (2013.01); *C01G 51/50* (2013.01);
(Continued)

(58) Field of Classification Search
CPC ............. H01M 4/00; H01M 4/50; H01M 4/52
(Continued)

(56) References Cited

U.S. PATENT DOCUMENTS

2009/0104530 A1 * 4/2009 Shizuka ................ H01M 4/505
 429/223
2009/0297947 A1   12/2009 Deng et al.
(Continued)

FOREIGN PATENT DOCUMENTS

JP   2003-346806 A   12/2003
JP   2006-172753   *  6/2006 ............. H01M 4/58
(Continued)

OTHER PUBLICATIONS

Shizuka et al. JP 2006-172753. Jun. 29, 2006. English machine translation by JPO.*
(Continued)

*Primary Examiner* — James Lee
(74) *Attorney, Agent, or Firm* — Hauptman Ham, LLP (57) ABSTRACT

A method of preparing a positive active material for a lithium secondary battery represented by the following Chemical Formula 1 ($Li_wNi_xCo_yMn_{1-x-y-z}M_zO_2$) includes: (a) preparing a metal salt aqueous solution including a lithium raw material, a manganese raw material, a nickel raw material, and a cobalt raw material; (b) wet-pulverizing the metal salt aqueous solution using beads having a particle diameter of 0.05 to 0.30 mm at 2000 to 6000 rpm for 2 to 12 hours to prepare a slurry; (c) adding a carbon source to the slurry; (d) spray-drying the slurry of the step (c) to prepare a mixed powder; and (e) heat-treating the mixed powder.

7 Claims, 4 Drawing Sheets

(51) Int. Cl.
  *H01M 4/485*  (2010.01)
  *H01M 10/052* (2010.01)
  *C01G 45/12*  (2006.01)
  *C01G 51/00*  (2006.01)
  *C01G 53/00*  (2006.01)

(52) U.S. Cl.
  CPC ............ *C01G 53/50* (2013.01); *H01M 4/505* (2013.01); *H01M 4/525* (2013.01); *H01M 10/052* (2013.01); *C01P 2002/52* (2013.01); *C01P 2002/72* (2013.01); *C01P 2004/03* (2013.01); *C01P 2004/61* (2013.01); *C01P 2006/12* (2013.01); *C01P 2006/14* (2013.01); *C01P 2006/40* (2013.01)

(58) Field of Classification Search
  USPC .................................................. 429/223–224
  See application file for complete search history.

(56) References Cited

U.S. PATENT DOCUMENTS

| | | | | |
|---|---|---|---|---|
| 2012/0282522 | A1* | 11/2012 | Axelbaum | B82Y 30/00 429/219 |
| 2013/0015396 | A1* | 1/2013 | Terashima | H01M 4/505 252/182.1 |

FOREIGN PATENT DOCUMENTS

| | | | |
|---|---|---|---|
| JP | 2011003551 A | | 1/2011 |
| JP | 2011249293 A | | 12/2011 |
| JP | 2012038561 A | | 2/2012 |
| JP | 2012038562 A | | 2/2012 |
| JP | 2013051086 A | | 3/2013 |
| KR | 10-2009-0027574 A | | 3/2009 |
| KR | 10-2011-0108566 A | | 10/2011 |
| WO | 03044881 A1 | | 5/2003 |
| WO | WO 2011/114534 | * | 9/2011 ............ H01M 4/505 |

OTHER PUBLICATIONS

International Search Report dated Mar. 29, 2013 for PCT/KR2012/007598.

P.S. Whitfield, S. Niketic, I.J. Davidson, Effects of synthesis on electrochemical, structural and physical properties of solution phases of Li2MnO3—LiNi1—xCoxO2, Journal of Power Sources, Apr. 27, 2005, p. 617-621, vol. 146, Elsevier B.V., Canada.

Hui-Oing Liu et al., Synthesis and electrochemical properties of olivine LiFePO4 prepared by a carbothermal reduction method, Journal of Power Sources, Mar. 8, 2008, p. 469-472, vol. 184, Elsevier B.V., Canada.

Written Opinion for PCT/KR2012/007598 dated Mar. 29, 2013.

* cited by examiner

POSITIVE ACTIVE MATERIAL FOR LITHIUM SECONDARY BATTERY AND METHOD OF PREPARING SAME

CROSS REFERENCE TO RELATED APPLICATION

This application claims the priority of Korean Patent Application No. 10-2012-0010054, filed on Jan. 31, 2012 in the Korean Patent and Trademark Office. Further, this application is the National Phase application of International Application No. PCT/KR2012/007598 filed on Sep. 21, 2012, which is incorporated herein by reference in its entirety.

BACKGROUND OF THE INVENTION (a) Field of the Invention

A positive active material for a lithium secondary battery and a method of preparing the same are disclosed.

(b) Description of the Related Art

As use of small portable electric/electronic devices has widely increased, a new secondary battery such as a nickel hydrogen battery or a lithium secondary battery has been actively developed. The lithium secondary battery uses carbon such as graphite and the like as a negative active material, a metal oxide including lithium as a positive active material, and a non-aqueous solvent as an electrolyte solution. The lithium is a metal having a high ionization tendency and may realize a high voltage, and thus is used to develop a battery having high energy density.

The positive active material to be used for the battery is a lithium transition metal oxide including lithium as a positive active material, and specifically, 90% or more use a layered lithium transition metal oxide such as cobalt-based and nickel-based lithium transition metal oxides, a three component-based lithium transition metal oxide in which cobalt, nickel, and manganese coexist, and the like.

However, the layered lithium transition metal oxide that is widely used as a conventional positive active material has reversible capacity of less than or equal to 200 mAh/g$^{-1}$ and thus has a limit in terms of energy density. In order to solve the problem of the conventional layered lithium metal oxide, a lithium-rich lithium metal oxide positive active material having 1 or more lithium compounds has been actively researched.

Accordingly, in order to solve the problem of a lithium secondary battery due to the limited reversible capacity of a positive electrode, a lithium-rich lithium metal oxide (OLO) positive active material has been suggested instead of the layered lithium transition metal oxide.

The lithium-rich lithium metal oxide positive active material includes a conventional layered positive electrode material which is combined with a $Li_2MnO_3$ phase, and may realize high capacity of greater than or equal to 200 mAh/g$^{-1}$ since the $Li_2MnO_3$ phase is electrochemically activated into a layered lithium transition metal oxide through a reaction of oxygen dissociation, lithium extraction, and the like when initially charged at 4.6 V or more.

However, since this lithium-rich lithium metal oxide positive active material is difficult to uniformly prepare during preparation of its precursor, its particle density may be deteriorated or its composition depending on a depth may not be uniform, and thus its electrochemical activation through a high voltage charge is limited, the positive active material has deteriorated discharge capacity, and in addition, since manganese (Mn) elution becomes severe at a high temperature and a high voltage, performance and cycle-life characteristics of a battery may be deteriorated.

Accordingly, in order to prepare a lithium-rich lithium metal oxide positive active material having excellent charge and discharge characteristics and cycle-life characteristics as well as high capacity, a method capable of decreasing a manufacturing cost and time as well as easily adjusting a particle size and a surface porosity has been required.

SUMMARY OF THE INVENTION

Technical Object

One embodiment of the present invention provides a method of preparing a positive active material having a uniform composition, a uniform particle size, high surface porosity, and a high discharge capacity.

Another embodiment of the present invention provides a lithium secondary battery having excellent cycle-life characteristics and rate capability.

Technical Solution

One embodiment of the present invention provides a method of preparing a positive active material for a lithium secondary battery represented by the following Chemical Formula 1 that includes: (a) preparing a metal salt aqueous solution including a lithium raw material, a manganese raw material, a nickel raw material, and a cobalt raw material; (b) wet-pulverizing the metal salt aqueous solution using beads having a particle diameter of 0.05 to 0.30 mm at 2000 to 6000 rpm for 2 to 12 hours to prepare a slurry; (c) adding a carbon source to the slurry; (d) spray-drying the slurry of the step (c) to prepare a mixed powder; and (e) heat-treating the mixed powder.

$$Li_wNi_xCo_yMn_{1-x-y-z}M_zO_2 \qquad \text{[Chemical Formula 1]}$$

In the above Chemical Formula 1, $1.2 \leq w \leq 1.5$, $0 < x < 0.5$, $0 < y < 0.5$, $0.5 < 1-x-y-z < 1$, $0 \leq z < 1$, and M is one or more selected from the group consisting of Al, Mg, Fe, Cu, Zn, Cr, Ag, Ca, Na, K, In, Ga, Ge, V, Mo, Nb, Si, Ti, and Zr.

The manganese raw material may be selected from a manganese sulfate salt, a manganese nitrate salt, a manganese hydrochlorate salt, a manganese acetate salt, and a combination thereof.

The nickel raw material may be selected from a nickel sulfate salt, a nickel nitrate salt, a nickel hydrochlorate salt, a nickel acetate salt, and a combination thereof.

The cobalt raw material may be selected from a cobalt sulfate salt, a cobalt nitrate salt, a cobalt hydrochlorate salt, a cobalt acetate salt, and a combination thereof.

The carbon source may be selected from sucrose, urea, acetic acid, ethylene glycol, and a combination thereof.

The carbon source may be included in an amount of 1 wt % to 10 wt % based on the total amount of the positive active material.

In the step (c), a binder, an additive, and a combination thereof may be further added.

The positive active material may have an average primary particle diameter ranging from greater than or equal to 200 nm to less than 600 nm.

The mixed powder may be heat-treated at 800 to 1200° C. for 2 to 24 hours.

The heat-treating of the mixed powder may include a primary firing process at 500 to 750° C. for 2 to 12 hours and a secondary firing process at 800 to 1000° C. for 4 to 8 hours.

Another embodiment of the present invention provides a positive active material for a lithium secondary battery prepared according the preparing method.

Another embodiment of the present invention provides a positive active material for a lithium secondary battery represented by the following Chemical Formula 1 and having an average primary particle diameter ranging from greater than or equal to 200 nm to less than 600 nm and surface porosity ranging from 15 to 30%.

[Chemical Formula 1]

In the above Chemical Formula 1, $1.2 \leq w \leq 1.5$, $0<x<0.5$, $0<y<0.5$, $0.5<1-x-y-z<1$, $0 \leq z<1$, and M is one or more selected from the group consisting of Al, Mg, Fe, Cu, Zn, Cr, Ag, Ca, Na, K, In, Ga, Ge, V, Mo, Nb, Si, Ti, and Zr.

The surface porosity may range from 20 to 25%.

Another embodiment of the present invention provides a lithium secondary battery including: the positive electrode including a positive active material; a negative electrode including a negative active material being capable of intercalating and deintercalating lithium ions; a separator interposed between the positive electrode and negative electrode; and a non-aqueous electrolyte.

The lithium secondary battery may have discharge capacity of 200 mAhg$^{-1}$ or more.

Effect

The method of the present invention is capable of massively producing a positive active material having a uniform composition and particle size and high surface porosity by easily adjusting its particle size and shape and remarkably reducing cost and time for preparing the positive active material compared with a conventional method.

In addition, the present invention realizes a lithium secondary battery having excellent cycle-life characteristics and rate capability.

DETAILED DESCRIPTION OF THE EMBODIMENTS

Hereinafter, embodiments of the present invention are described in detail. However, these embodiments are exemplary, and this disclosure is not limited thereto.

One embodiment of the present invention provides a method of preparing a positive active material for a lithium secondary battery represented by the following Chemical Formula 1, and the preparing method includes: (a) preparing a metal salt aqueous solution including a lithium raw material, a manganese raw material, a nickel raw material, and a cobalt raw material; (b) wet-pulverizing the metal salt aqueous solution using beads having a particle diameter of 0.05 to 0.30 mm at 2000 to 6000 rpm for 2 to 12 hours to prepare slurry; (c) adding a carbon source to the slurry; (d) spray-drying the slurry of the step (c) to prepare a mixed powder; and (e) heat-treating the mixed powder.

[Chemical Formula 1]

In the above Chemical Formula 1, $1.2 \leq w \leq 1.5$, $0<x<0.5$, $0<y<0.5$, $0.5<1-x-y-z<1$, $0 \leq z<1$, and M is one or more selected from the group consisting of Al, Mg, Fe, Cu, Zn, Cr, Ag, Ca, Na, K, In, Ga, Ge, V, Mo, Nb, Si, Ti, and Zr.

Hereinafter, each step (a) to (e) is specifically illustrated.

Step (a)

A metal salt aqueous solution is prepared by mixing a lithium raw material, a manganese raw material, a nickel raw material, and a cobalt raw material in appropriate amounts and agitating the mixture to prepare a positive active material represented by the following Chemical Formula 1.

[Chemical Formula 1]

In the above Chemical Formula 1, $1.2 \leq w \leq 1.5$, $0<x<0.5$, $0<y<0.5$, $0.5<1-x-y-z<1$, $0 \leq z<1$, and M is one or more selected from the group consisting of Al, Mg, Fe, Cu, Zn, Cr, Ag, Ca, Na, K, In, Ga, Ge, V, Mo, Nb, Si, Ti, and Zr.

The lithium raw material may be lithium carbonate, lithium hydroxide, lithium nitrate, lithium oxide, and a combination thereof.

The manganese raw material may be a manganese sulfate salt, a manganese nitrate salt, a manganese hydrochlorate salt, a manganese acetate salt, and a combination thereof.

The nickel raw material may be a nickel sulfate salt, a nickel nitrate salt, a nickel hydrochlorate salt, a nickel acetate salt, and a combination thereof.

The cobalt raw material may be a cobalt sulfate salt, a cobalt nitrate salt, a cobalt hydrochlorate salt, a cobalt acetate salt, and a combination thereof.

In one embodiment, the positive active material represented by the above Chemical Formula 1 may be Li$_{1.3}$Ni$_{0.2}$Co$_{0.1}$Mn$_{0.7}$O$_2$, Li$_{1.3}$Ni$_{0.25}$Co$_{0.05}$Mn$_{0.7}$O$_2$, Li$_{1.3}$Ni$_{0.2}$Co$_{0.1}$Al$_{0.05}$Mn$_{0.65}$O$_2$, and the like.

In addition, when the lithium raw material, manganese raw material, nickel raw material, cobalt raw material, and the like are mixed, an aqueous solvent or an organic solvent, for example, water, may be used. For example, in order to prepare the Li$_{1.3}$Ni$_{0.2}$Co$_{0.1}$Mn$_{0.7}$O$_2$, the metal salt aqueous solution lithium may be prepared by mixing lithium carbonate, nickel oxide, cobalt oxide, and manganese oxide in a ratio of 1.50:0.20:0.10:0.70 and adding ultrapure water to the mixture.

Step (b)

The metal salt aqueous solution is ground at 2000 to 6000 rpm for 2 to 12 hours in a wet pulverizing-sieving apparatus using beads having a particle diameter ranging from 0.05 to 0.30 mm to form a slurry including a solid (a co-precipitation precursor). Herein, the wet pulverizing-sieving apparatus may include a generally-used apparatus.

The wet pulverizing-sieving apparatus may use a pulverizing medium, for example, beads including alumina, zirconia, yttria, and the like, and specifically, alumina beads. Herein, the beads may have a particle diameter ranging from 0.05 to 0.30 mm, for example, 0.05 to 0.10 nm. When the beads have a particle diameter within the range, a solid in the slurry may be adjusted to not have too big or small an average particle diameter, and herein, the mixed powder (a precursor of the positive active material) formed after the spray-drying in the step (d) may have an average particle diameter ranging from 50 to 200 nm. When the mixed powder has a particle size within the range, deterioration of a lithium secondary battery may be prevented.

The metal salt aqueous solution may be ground at a wet pulverizing speed ranging from 2000 to 6000 rpm, for example, 3000 to 5000 rpm. When the pulverizing is performed within the speed range, the solid in the slurry may be sufficiently ground but not too finely pulverized. Accordingly, since the solid has too small a size, a positive active material is prevented from having too high a density, which deteriorates capacity.

On the other hand, the wet-pulverizing of the metal salt aqueous solution may be performed for 2 to 12 hours, for example, 6 to 10 hours. When the metal salt aqueous solution is ground within the range, discharge capacity deterioration generated by a finally-obtained positive active material that has an average particle diameter of greater than 600 nm may be prevented, and in addition, the solid may be prevented from having too small an average particle diameter.

Step (c)

A carbon source is added to the slurry obtained from the step (b).

The carbon source controls particle size of the positive active material by suppressing its crystal growth. Specifically, the carbon source is oxidized in the following heat-treating step (e) and releases carbon dioxide, and herein, the carbon dioxide may suppress crystals of the positive active material from being continuously agglomerated and growing. Accordingly, when the carbon source is added to the slurry, the positive active material may have an average primary particle diameter ranging from greater than or equal to 200 nm and less than 600 nm and preferably greater than or equal to 400 nm and less than or equal to 500 nm, and surface porosity ranging from 15 to 30%.

On the other hand, since a conventional method including no addition of the carbon source does not control a primary particle size of a positive active material, the positive active material may have no uniform particle diameter and an average particle diameter of greater than 600 nm, failing in easily obtaining a uniform and dense positive active material. However, when the carbon source is added in the step (c), the positive active material may be easily controlled to have an average primary particle diameter of greater than or equal to 200 nm and less than 600 nm, for example, greater than or equal to 400 nm and less than or equal to 500 nm, and thus realize high capacity.

The carbon source added to the slurry may include sucrose, urea, acetic acid, ethylene glycol, and the like, and preferably sucrose. In addition, the carbon source may be included in an amount of 1 to 10 wt %, for example 2 to 5 wt %, based on the total amount of the positive active material. When the carbon source is included within the ranges, size and surface porosity of the positive active material may be easily controlled, realizing high capacity.

On the other hand, a binder, an additive, and the like other than the carbon source may be added to the slurry, and the binder and the additive may be commonly used in a related art. For example, the binder may help primary particles of a positive active material agglomerate to one another, and may include a non-water-soluble binder, a water-soluble binder, or a combination thereof.

The non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

Step (d)

In the step (d), the slurry obtained in the step (c) is spray-dried, obtaining a mixed powder.

The spray-drying of the slurry is performed by supplying a gas such as air, nitrogen, and the like, but generally air. The spray-drying may be performed under a pressurized atmosphere, for example, under an air pressure ranging from 1.3 to 2.0 bar. In addition, the spray-drying may be performed at a temperature ranging from 105 to 250° C.

The spray-drying is performed by using a nozzle having a predetermined hole size without a particular limit, and using any well-known spray-drier. In general, spray-drying is performed by using a rotary disk and a nozzle, and the nozzle is classified into a pressure nozzle and a two-fluid nozzle. In addition, any spray equipment that is well-known in a related art such as a rotary sprayer, a pressure nozzle, an air nozzle, a sonic nozzle, and the like may be used. The spraying equipment may be selected by typically considering a supply speed, viscosity of a supplied object, a desired particle size for a spray-dried product, dispersion, droplet size of a water-in-oil emulsion or water-in-oil microemulsion, and the like. Herein, a positive active material precursor included in the spray-dried mixed powder has an average particle diameter ranging from 50 to 200 nm. When the positive active material precursor has a primary particle size of less than 50 nm, a positive active material has too low a density due to too low a solid rate and causes deterioration of a lithium secondary battery, but when the precursor has a primary particle of greater than 200 nm, raw materials may not be uniformly mixed which also causes the battery deterioration.

Step (e)

The positive active material precursor obtained through the spray-drying in the step (c) is heat-treated at 800 to 1200° C. for 2 to 24 hours.

When the heat-treating is performed at too high a temperature, primary particles may excessively grow, and when the heat-treating is performed at too low a temperature, a positive active material has a problem of a low volume density and an extremely large specific surface area, and accordingly, the temperature may be in a range of 800 to 1000° C., and specifically, 850 to 950° C.

In addition, when the heat-treating is performed for too long, a manufacturing cost may be increased, and post pulverization may be additionally needed. Accordingly, the heat-treating may be performed for 2 to 24 hours, and specifically, for 8 to 16 hours. However, when the heat-treating is performed within the time range, a positive active material may maintain a primary particle size in a range of greater than or equal to 200 nm and less than 600 nm, and thus have high volume density and high surface porosity. The firing temperature may vary depending on a raw material included in the positive active material.

In addition, the heat-treating may include primary and secondary firing processes. For example, the mixed powder obtained through the spray-drying may be primarily fired at 500 to 750° C. for 2 to 12 hours, and then secondarily fired at 800 to 1000° C. for 4 to 8 hours. When the heat-treating is performed within the temperature and time ranges, a cost for manufacturing a positive active material may be decreased by decreasing heat-treating time during the secondary firing.

Another embodiment of the present invention provides a positive active material for a lithium secondary battery obtained according to the method.

According to one embodiment, a positive active material for a lithium secondary battery represented by the following Chemical Formula 1 has an average primary particle diameter of greater than or equal to 200 nm and less than 600 nm, and surface porosity of greater than or equal to 15 to 30%.

[Chemical Formula 1]

In the above Chemical Formula 1, $1.2 \leq w \leq 1.5$, $0 < x < 0.5$, $0 < y < 0.5$, $0.5 < 1-x-y-z < 1$, $0 \leq z < 1$, and M is one or more selected from the group consisting of Al, Mg, Fe, Cu, Zn, Cr, Ag, Ca, Na, K, In, Ga, Ge, V, Mo, Nb, Si, Ti, and Zr.

On the other hand, the positive active material represented by the above Chemical Formula 1 is a lithium-rich layered metal composite oxide including lithium in an amount of greater than or equal to about 1.2 mol and less than or equal to about 1.5 mol, and has a structure in which the lithium metal composite oxide and $Li_2MnO_3$ exist as a solid solution. When a lithium secondary battery manufactured by using the positive active material is charged at about 4.6 to 5.0 V, $Li_2MnO_3$ is electrochemically activated and may realize discharge capacity of greater than or equal to 200 mAhg$^{-1}$. Herein, when the lithium-rich layered metal composite oxide is charged at a high voltage of greater than or equal to 4.6 V based on a positive electrode potential, the lithium-rich layered metal composite oxide has a plateau level around about 4.6 to about 5 V and generates oxygen. Herein, the charge may be performed in a well-known method in a related art without a particular limit.

The positive active material may include nickel, cobalt, and manganese, and the nickel, cobalt, and manganese may be mixed in a mole ratio that is appropriately adjusted depending on a purpose. The manganese may be included in an amount of greater than or equal to 0.5 mol based on the total weight of the metals other than lithium. Herein, structural stability of the positive active material is improved, and a part of the manganese may be substituted with another element to prolong cycle-life characteristics. A metal for the substitution may be a transition metal, a rare earth element or the like, for example, at least one metal selected from the group consisting of Al, Mg, Fe, Cu, Zn, Cr, Ag, Ca, Na, K, In, Ga, Ge, V, Mo, Nb, Si, Ti, and Zr.

The positive active material may have an average primary particle diameter of greater than or equal to 200 nm and less than 600 nm, for example, less than or equal to 400 to 500 nm. When the positive active material has an average primary particle diameter within the range, the positive active material may have surface porosity of 15 to 30%.

That is, the positive active material has surface porosity ranging from 15% to 30%, and preferably, 20 to 25%. When the surface porosity is too high, contact resistance among the particles increases and leads to decreasing output, while when the surface porosity is too low, the oxygen generated during charge at a high voltage of greater than or equal to 4.6 V to electrochemically activate the $Li_2MnO_3$ included in the positive active material is not released, failing in realizing high-capacity of greater than or equal to 200 mAhg$^{-1}$. In this way, when the positive active material has a primary particle size and surface porosity within the ranges, high-capacity and excellent charge and discharge characteristics may be obtained.

Another embodiment of the present invention provides a lithium secondary battery including: a positive electrode including a positive active material represented by the above Chemical Formula 1; a negative electrode including a negative active material being capable of intercalating and deintercalating lithium ions; a separator interposed between the positive electrode and negative electrode; and a non-aqueous electrolyte.

The lithium secondary battery has discharge capacity of 200 mAhg$^{-1}$ or more.

The lithium secondary battery may have any shape such as a coin, a button, a sheet, a cylinder, a prism, and the like. The variously-shaped lithium secondary batteries may be prepared in a conventional method, which will not be illustrated in detail. In addition, manufacture of the positive electrode and constitution of the lithium secondary battery are briefly illustrated, but the present invention is not limited thereto.

The positive electrode may be prepared by dissolving the positive active material represented by the above Chemical Formula 1 along with a conductive material, a binder, and other additives, for example, at least one additive selected from a filler, a dispersing agent, an ion conductive material, a pressure enhancer, and the like in an appropriate organic solvent to prepare a slurry or paste, coating the slurry or paste on a current collector, and drying and compressing it.

The positive electrode includes a current collector and a positive active material layer represented by the above Chemical Formula 1, and the positive active material layer may be formed by using the positive active material having a coating layer on the surface or by mixing the positive active material with a compound having a coating layer. The coating layer may be formed by using an oxide of Mg, Al, Co, K, Na, Ca, Si, Ti, V, Sn, Ge, Ga, B, As, or Zr, or a mixture thereof, as a coating element compound.

The binder may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The conductive material improves conductivity of an electrode, any electrically conductive material may be used as the conductive material unless it causes a chemical change, and examples thereof may be one or more of natural graphite, artificial graphite, carbon black, acetylene black, ketjen black, a carbon fiber, a metal powder, a metal fiber, and the like of copper, nickel, aluminum, silver, and the like, and a conductive material such as a polyphenylene derivative and the like.

The current collector of the positive electrode may be a foil, a sheet, and the like of copper, nickel, stainless steel, aluminum, and the like, or a carbon fiber and the like.

The negative electrode includes a current collector and a negative active material layer formed on the current collector.

As the negative active material, one or two kinds of a composite oxide and the like of a carbon material such as graphite and the like or a transition metal capable of reversibly intercalating/deintercalating lithium ions may be used. Other than these materials, silicon, tin, and the like may be used as the negative electrode material.

The negative active material layer includes a binder, and may optionally include a conductive material.

The binder improves binding properties of negative active material particles with one another and with a current collector, and examples thereof may be polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

Examples of the conductive material may be: a carbon-based material such as natural graphite, artificial graphite, carbon black, acetylene black, ketjen black, carbon fiber, and the like; a metal-based material such as a metal powder or a metal fiber and the like of copper, nickel, aluminum, silver, and the like; a conductive polymer such as a polyphenylene derivative and the like; and a mixture thereof.

The negative current collector may be a copper foil, a nickel foil, a stainless steel foil, a titanium foil, a nickel foam, a copper foam, a polymer substrate coated with a conductive metal, or a combination thereof.

The electrolyte includes a non-aqueous organic solvent and a lithium salt.

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may include methyl acetate, ethyl acetate, n-propyl acetate, dimethyl acetate, methyl propionate, ethyl propionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and the like, and the ketone-based solvent may be cyclohexanone and the like. The alcohol-based solvent may be ethanol, isopropyl alcohol, and the like, and the aprotic solvent may be nitriles of R—CN (R is a C2 to C20 linear, branched, or cyclic structured hydrocarbon group, and may include a double bond aromatic ring or an ether bond) and the like, amides of dimethylformamide and the like, dioxolanes such as 1,3-dioxolane and the like, or sulfolanes and the like.

The non-aqueous organic solvent may be used singularly or in a mixture, and when the organic solvent is used in a mixture, the mixture ratio may be controlled in accordance with a desirable battery performance.

A lithium salt dissolved in such a solvent may include $LiClO_4$, $LiBF_4$, $LiPF_6$, $LiAlCl_4$, $LiSbF_6$, LiSCN, $LiCF_3SO_3$, $LiCF_3CO_2$, $Li(CF_3SO_2)_2$, $LiAsF_6$, $LiN(CF_3SO_2)_2$, $LiB_{10}Cl_{10}$, LiBOB (lithium bis(oxalato)borate), a lower aliphatic lithium carbonate, chloroborane lithium, imides of $LiN(CF_3SO_2)$, $Li(C_2F_5SO_2)$, $LiN(CF_3SO_2)_2$, $LiN(C_2F_5SO_2)_2$, and $LiN(CF_3SO_2)(C_4F_9SO_2)$, and the like. These lithium salts may be used alone or may be randomly combined in an electrolyte solution and the like unless they damage the effect of the present invention. Particularly, $LiPF_6$ may be preferably included. In addition, carbon tetrachloride, trifluorochloroethylene, or a phosphate salt and the like including phosphorus may be included in the electrolyte solution so as to make the electrolyte solution nonflammable.

The separator may be polyethylene, polypropylene, polyvinylidene fluoride, or a multi-layer of the above, and a mixed multi-layer such as a polyethylene/polypropylene double-layered separator, a polyethylene/polypropylene/ polyethylene triple-layered separator, a polypropylene/polyethylene/polypropylene triple-layered separator, and the like may be used.

Hereinafter, examples of the present invention and comparative examples are described. These examples, however, are not in any sense to be interpreted as limiting the scope of the invention.

EXAMPLE 1

Preparation of Positive Active Material

Lithium carbonate, nickel oxide, cobalt oxide, and manganese oxide were mixed in a metal mole ratio of 1.50:0.20:0.10:0.70 to prepare 200 g of a mixture, and ultrapure water was added thereto until the mixture had a solid concentration of 40%, obtaining a metal salt aqueous solution. The metal salt aqueous solution was put in a storage tank of a wet pulverizing-sieving apparatus and then ground at a speed of 4000 rpm for 8 hours by using 0.1 mm beads, preparing a slurry.

Figure 1:
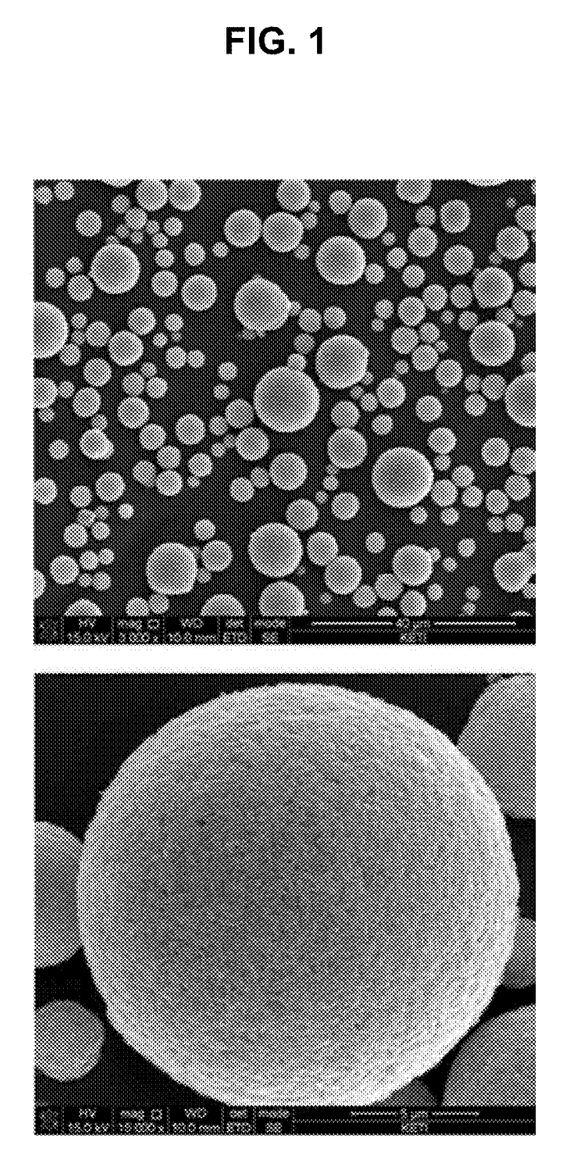
FIG. 1 is a SEM photograph showing a positive active material according to Example 1.

Polyacrylic acid and sucrose as a carbon source were added to the slurry to be respectively included in an amount of 0.5 wt % and 5 wt % based on the total weight of a final positive active material, and distilled water was added thereto so that a solid became 25% of the slurry. The slurry obtained by adding the distilled water was dried using a hot air spray-drying method. Herein, drying conditions for the spray-drying with a hot air spray drier were an inlet temperature of about 250° C. and an outlet temperature of about 105° C. to maintain its internal temperature at about 120° C., and the spraying conditions were air pressure of 1.5 bar and a flow rate of 5.6 MPa. As a result, a spherically shaped precursor obtained therefrom had a uniform average primary particle diameter of 100 nm and an average particle diameter of 12 μm (FIG. 1).

Figure 2:
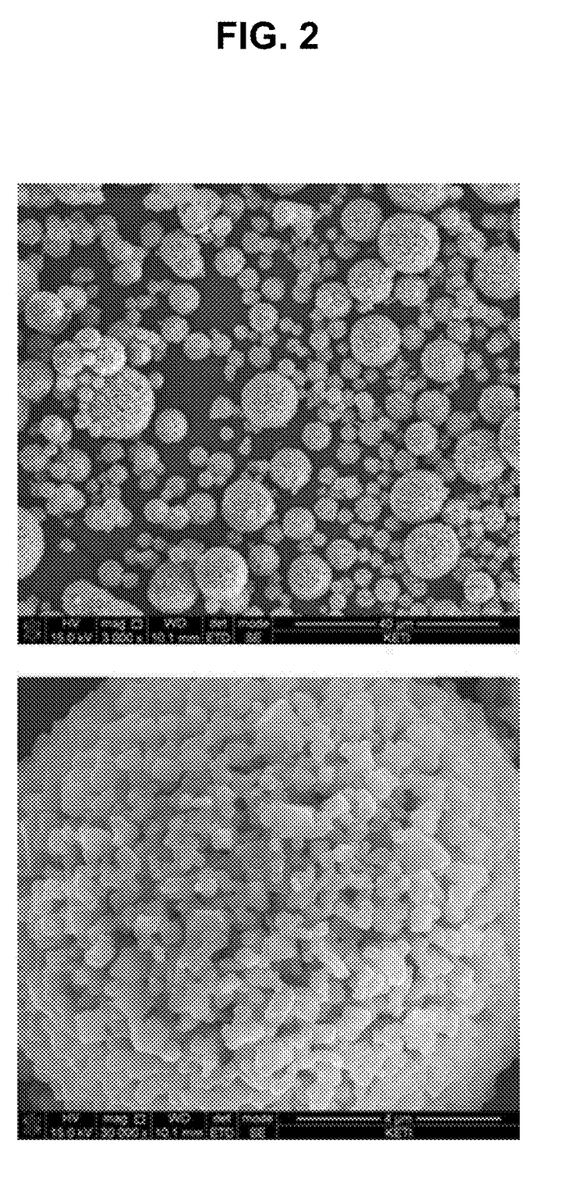
FIG. 2 is a SEM photograph showing a positive active material according to Comparative Example 1.

After the spray-drying, the obtained precursor was heat-treated at about 1000° C. for 6 hours in an air atmosphere, preparing a positive active material, and the positive active material had an average primary particle diameter of 500 nm and an average particle diameter ranging from 5 to 25 μm. A SEM photograph of the positive active material was taken using JSM-7000F (Jeol Inc.) and is provided in FIG. 2. In addition, X-ray diffraction analysis (XRD) of the positive active material was performed, and the result is provided in FIG. 3.

COMPARATIVE EXAMPLE 1

A positive active material was prepared according to the same method as Example 1 except for changing the wet-pulverizing time from 8 hours to 3 hours in Example 1, and the positive active material had an average primary particle diameter of 800 nm.

Comparative Example 2

A positive active material was prepared according to the same method as Example 1 except for not adding sucrose to the slurry, and the positive active material primary particle had an average particle diameter of 600 nm.

COMPARATIVE EXAMPLE 3

A positive active material was prepared according to the same method as Example 1 except for using 0.5 mm beads instead of the 0.1 mm beads and changing the pulverizing time to 3 hours, and the positive active material primary particle had an average particle diameter of 850 nm.

Manufacture of Lithium Secondary Battery Cell 95 wt % of each positive active material according to Example 1 and Comparative Examples 1 to 3, 2 wt % of acetylene black as a conductive material, and 2 wt % of polyvinylidene fluoride (PVdF) as a binder were dissolved in N-methylpyrrolidone (NMP), preparing a slurry. This slurry was coated to be 20 μm thick on an aluminum foil, dried and compressed with a press, and then dried under vacuum at 120° C. for 16 hours, manufacturing a circular disk having a diameter of 16 mm. As for a counter electrode, a thin lithium metal film diameter punched to have a diameter of 16 mm was used, and a polypropylene (PP) film was used as a separator. An electrolyte solution was prepared by mixing ethylene carbonate (EC)/dimethylether (DME) in a volume ratio of 1:1 and dissolving 1 M $LiPF_6$ therein. The electrolyte solution was impregnated with the separator, this separator was inserted between the working electrode and its counter electrode, and then a case (CR2032, SUS) was used, manufacturing a lithium secondary battery cell.

EXPERIMENTAL EXAMPLE 1

Surface Porosity of Positive Active Material (1) Measurement of Surface Porosity Surface porosity of the positive active materials according to Example 1 and Comparative Examples 1 to 3 was measured by using a specific surface area measuring instrument (Tristar3020, Micromeritics Instrument Corp.). The results are provided in Table 1.

EXPERIMENTAL EXAMPLE 2

Property of Lithium Secondary Battery Cell (1) Cycle-Life Maintenance Ratio

The lithium secondary battery cells according to Example 1 and Comparative Example 2 were repeatedly charged and discharged 50 times. First of all, the charge was performed at a constant current of 25 mA/g at room temperature of 25° C. until a voltage reached 4.8 V, and then at a constant voltage of 4.8 V until the current became 5 mA/g, and the discharge was performed at 0.1 C until the voltage became 2.0 V.

The charge and discharge as one cycle were repeated 50 times, and then discharge capacity of the cells was measured. The cycle-life maintenance ratio (%) of the cells was calculated according to the following equation, and the results are provided in the following Table 1.

Cycle-life maintenance ratio (%)=(discharge capacity after 50 charges and discharges/initial discharge capacity)×100  [Equation]

As shown in Table 1, the positive active material according to Example 1 showed high surface porosity of 20%, while the positive active materials according to Comparative Examples 1 to 3 respectively showed lower surface porosity of 13%, 10%, and 5% than that of Example 1.

In addition, the lithium secondary battery cell of Example 1 showed a high cycle-life maintenance ratio (cycle retention) of 96% after the 50 charges and discharges, while Comparative Example 1 having insufficient pulverizing time and Comparative Example 2 including no carbon source respectively showed sharply lower cycle-life maintenance ratios of 86% and 78%, and Comparative Example 3 using too big a bead at 0.5 mm and having insufficient pulverizing time showed low surface porosity and thus a remarkably low cycle-life maintenance ratio of 65%.

Figure 5:
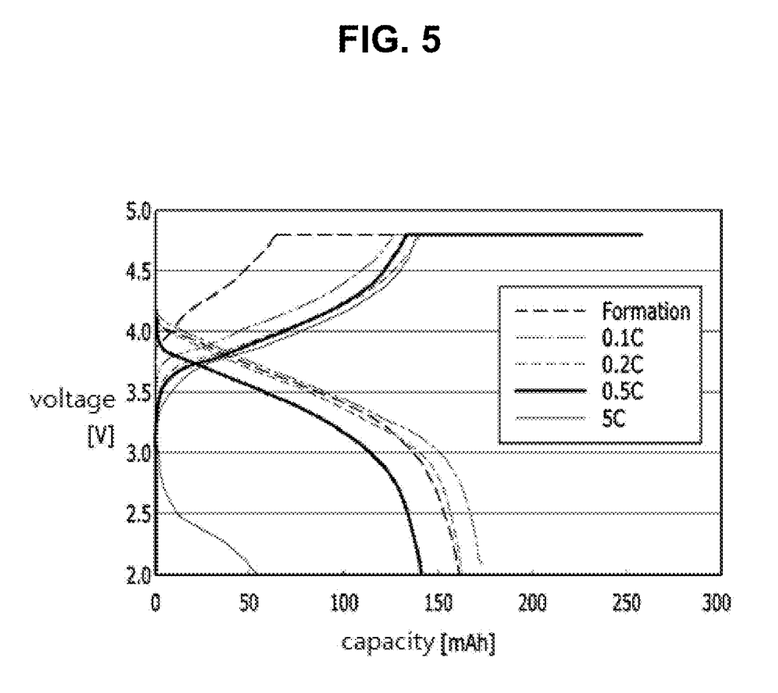
FIG. 5 is a graph showing charge and discharge characteristics of a lithium secondary battery according to Comparative Example 1.

In addition, when charged and discharged at 0.1 C, the positive active material of Example 1 showed high initial discharge capacity of 202 $mAhg^{-1}$, but Comparative Examples 1 to 3 respectively showed low initial discharge capacity of 174 $mAhg^{-1}$, 156 $mAhg^{-1}$, and 120 $mAhg^{-1}$ as shown in FIGS. 5 and 6.

Figure 3:
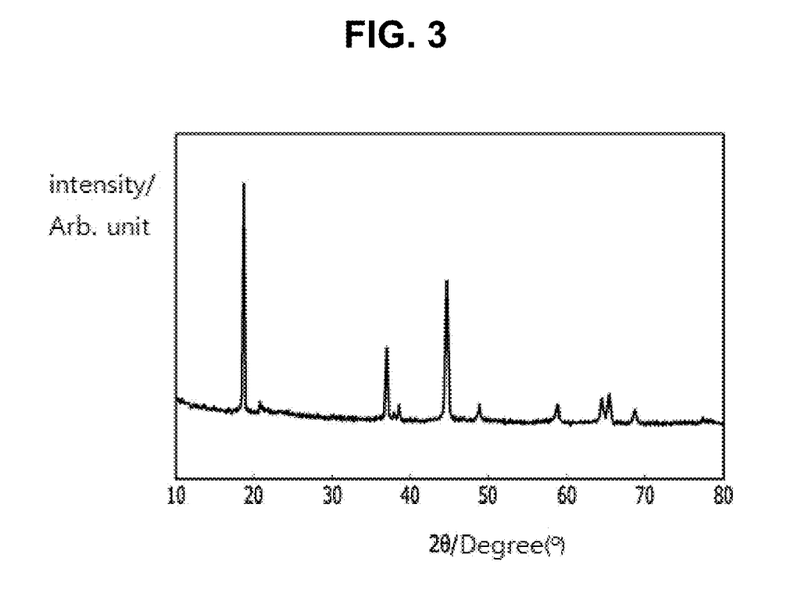
FIG. 3 shows an XRD analysis result of the positive active material according to Example 1.

On the other hand, the positive active material of Example 1 turned out to be a lithium-rich-based positive active material including a $Li_2MnO_3$ phase, as a high peak at 21° was shown in FIG. 3.

(2) Rate Capability

Figure 4:
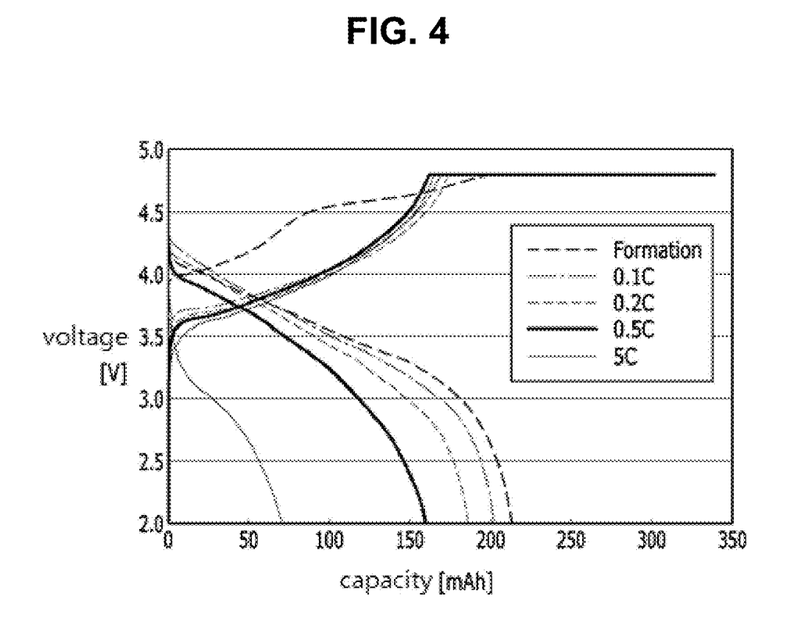
FIG. 4 is a graph showing charge and discharge characteristics of a lithium secondary battery according to Example 1.

The rate (C-rate) characteristics of the cells according to Example 1 and Comparative Example 1 were evaluated by using TOSCAT 3000 (Toyo System Inc.) and performing charge and discharge at room temperature of 25° C. at a potential ranging from 2.0 to 4.8 V under various current density conditions (0.1 C, 0.2 C, 0.5 C, and 5 C). As a result, the charge and discharge graphs shown in FIGS. 4 and 5 were obtained. Comparing FIG. 4 with FIG. 5, a secondary battery cell using the positive active material according to Example 1 showed excellent lithium rate capability compared with the secondary battery cell using the positive active material according to Comparative Example 1.

Accordingly, the present invention provides a lithium secondary battery cell having discharge capacity of greater than or equal to 200 $mAhg^{-1}$ and an excellent cycle-life maintenance ratio by controlling pulverizing time and speed as well as size of beads and adding a carbon source to a slurry obtained after the pulverizing to obtain a precursor and a positive active material particle having a uniform size, thus preventing density deterioration of the positive active material and increasing its surface porosity.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

TABLE 1

|  | Pulverization time | Bead size | Sucrose amount | Surface porosity | 0.1 C discharge capacity | Cycle-life maintenance ratio after $50^{th}$ cycle |
| --- | --- | --- | --- | --- | --- | --- |
| Ex. 1 | 8 hours | 0.1 mm | 5% | 20% | 202 $mAhg^{-1}$ | 96% |
| Comp. Ex. 1 | 3 hours | 0.1 mm | 5% | 13% | 174 $mAhg^{-1}$ | 86% |
| Comp. Ex. 2 | 8 hours | 0.1 mm | 0% | 10% | 156 $mAhg^{-1}$ | 78% |
| Comp. Ex. 3 | 3 hours | 0.5 mm | 5% | 5% | 120 mAhg-1 | 65% |

What is claimed is:

1. A method of preparing a positive active material for a lithium secondary battery represented by the following Chemical Formula 1, comprising:
   (a) preparing a metal salt aqueous solution including a lithium raw material, a manganese raw material, a nickel raw material, and a cobalt raw material;
   (b) wet-pulverizing the metal salt aqueous solution using beads having a particle diameter of 0.05 to 0.30 mm at 2000 to 6000 rpm for 2 to 12 hours to prepare a slurry;
   (c) adding a carbon source to the slurry;
   (d) spray-drying the slurry of the step (c) to prepare a mixed powder; and
   (e) heat-treating the mixed powder:

$$Li_wNi_xCo_yMn_{1-x-y-z}M_zO_2 \quad \text{[Chemical Formula 1]}$$

wherein, in the above Chemical Formula 1, $1.2 \leq w \leq 1.5$, $0<x<0.5$, $0<y<0.5$, $0.5<1-x-y-z<1$, $0 \leq z<1$, and M is one or more selected from the group consisting of Al, Mg, Fe, Cu, Zn, Cr, Ag, Ca, Na, K, In, Ga, Ge, V, Mo, Nb, Si, Ti, and Zr, and wherein the carbon source is included in an amount of 1 wt % to 10 wt % based on the total amount of the positive active material.

2. The method of claim 1, wherein the manganese raw material is selected from a manganese sulfate salt, a manganese nitrate salt, a manganese hydrochlorate salt, a manganese acetate salt, and a combination thereof,
   the nickel raw material is selected from a nickel sulfate salt, a nickel nitrate salt, a nickel hydrochlorate salt, a nickel acetate salt, and a combination thereof, and
   the cobalt raw material is selected from a cobalt sulfate salt, a cobalt nitrate salt, a cobalt hydrochlorate salt, a cobalt acetate salt, and a combination thereof.

3. The method of claim 1, wherein the carbon source is selected from sucrose, urea, acetic acid, ethylene glycol, and a combination thereof.

4. The method of claim 1, wherein the step (c) includes addition of a binder, an additive and a combination thereof to the slurry.

5. The method of claim 1, wherein the positive active material has an average primary particle diameter ranging from greater than or equal to 200 nm to less than 600 nm.

6. The method of claim 1, wherein the heat-treating in the step (e) is performed at 800° C. to 1200° C. for 2 to 24 hours.

7. The method of claim 1, wherein the heat-treating in the step (e) comprises a primary firing process performed at 500° C. to 750° C. for 2 to 12 hours, and
   a secondary firing process performed at 800° C. to 1000° C. for 4 to 8 hours.

* * * * *